United States Patent
Hanley

(10) Patent No.: US 10,128,685 B2
(45) Date of Patent: Nov. 13, 2018

(54) METHODS AND EQUIPMENT FOR PROVIDING BACKUP POWER IN CELLULAR BASE STATIONS

(71) Applicant: CommScope Technologies LLC, Hickory, NC (US)

(72) Inventor: John T. Hanley, Orland Park, IL (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/591,421

(22) Filed: May 10, 2017

(65) Prior Publication Data

US 2017/0331326 A1 Nov. 16, 2017

Related U.S. Application Data

(60) Provisional application No. 62/334,753, filed on May 11, 2016.

(51) Int. Cl.
   *H02J 9/06* (2006.01)
   *H04B 10/80* (2013.01)
   (Continued)

(52) U.S. Cl.
   CPC .......... *H02J 9/061* (2013.01); *H04B 10/807* (2013.01); *H04W 4/80* (2018.02); *H04W 88/085* (2013.01)

(58) Field of Classification Search
   CPC .............................. H02J 9/061; H04W 88/085
   (Continued)

(56) References Cited

U.S. PATENT DOCUMENTS 7,205,956 B1 * 4/2007 Sychaleun ............... H01P 3/12
                                                    333/248
7,432,617 B2 * 10/2008 Kanouda ................. H02J 9/061
                                                    307/66

(Continued)

OTHER PUBLICATIONS

International Search Report and the Written Opinion of the International Searching Authority corresponding to International Patent Application No. PCT/US2017/031864 (14 pages) (dated Aug. 1, 2017).

*Primary Examiner* — Hai V Nguyen
(74) *Attorney, Agent, or Firm* — Myers Bigel, P.A.

(57) ABSTRACT

A load accumulator for a cellular base station antenna includes a plurality of input terminals configured to receive a plurality of input voltages, a plurality of output terminals configured to be coupled to a respective plurality of tower top equipment and configured to supply output voltages to the tower top equipment, a plurality of switches coupled to respective ones of the plurality of input terminals and the plurality of output terminals; a voltage sensor coupled to at least one input terminal of the plurality of input terminals and configured to sense a level of one of the plurality of input voltages received at the at least one input terminal, a supplemental input terminal configured to receive a supplemental voltage, and a control logic coupled to the voltage sensor and to the plurality of switches and configured to detect that the supply voltage supplied to the at least one input terminal has fallen below a threshold voltage, and in response to detecting that the supply voltage supplied to the at least one of the plurality of input terminals has fallen below the threshold voltage, to supply the supplemental voltage to a respective one of the plurality of output terminals.

20 Claims, 13 Drawing Sheets

(51) Int. Cl.
*H04W 4/80* (2018.01)
*H04W 88/08* (2009.01)

(58) Field of Classification Search
USPC ........................................................ 455/572
See application file for complete search history.

(56) References Cited

U.S. PATENT DOCUMENTS

| | | | | |
|---|---|---|---|---|
| 7,705,562 B2* | 4/2010 | Takahashi | ............... | H02J 9/061 |
| | | | | 307/46 |
| 8,310,103 B2* | 11/2012 | Fischer | ................. | H02J 7/0019 |
| | | | | 307/66 |
| 8,497,600 B2* | 7/2013 | Fischer | ................. | H02J 7/0019 |
| | | | | 307/85 |
| 9,234,805 B2* | 1/2016 | Lin | ..................... | F02D 41/1466 |
| 9,281,866 B2* | 3/2016 | Smentek | ................. | H04B 3/44 |
| 9,448,576 B2* | 9/2016 | Chamberlain | ............ | G05F 1/62 |
| 9,472,956 B2* | 10/2016 | Michaelis | ............ | H04B 10/807 |
| 9,493,077 B2* | 11/2016 | Yamasaki | ................. | B60L 1/00 |
| 9,609,691 B2* | 3/2017 | Yokosawa | ............ | H04W 88/085 |
| 9,660,397 B2* | 5/2017 | Islam | ..................... | H01R 13/74 |
| 9,728,909 B2* | 8/2017 | Islam | ..................... | H01R 13/74 |
| 9,759,880 B2* | 9/2017 | Chamberlain | ........ | G02B 6/4284 |
| 9,894,471 B1* | 2/2018 | Zalewski | ............... | H04W 4/008 |
| 2006/0267410 A1* | 11/2006 | Kanouda | ................. | H02J 9/061 |
| | | | | 307/66 |
| 2007/0047100 A1* | 3/2007 | Takahashi | ............... | H02J 9/061 |
| | | | | 359/689 |
| 2010/0009724 A1* | 1/2010 | Fischer | .................... | H02J 1/10 |
| | | | | 455/573 |
| 2011/0227414 A1* | 9/2011 | Fischer | ................. | H02J 7/0019 |
| | | | | 307/66 |
| 2012/0221162 A1* | 8/2012 | Forbes, Jr. | ............. | G01D 4/004 |
| | | | | 700/295 |
| 2013/0069433 A1* | 3/2013 | Fischer | ................. | H02J 7/0019 |
| | | | | 307/65 |
| 2013/0232373 A1* | 9/2013 | Wang | ........................ | G06F 1/14 |
| | | | | 713/503 |
| 2014/0018969 A1* | 1/2014 | Forbes, Jr. | ................. | H02J 3/32 |
| | | | | 700/295 |
| 2015/0080055 A1* | 3/2015 | Smentek | ................... | H04B 3/44 |
| | | | | 455/561 |
| 2015/0114086 A1* | 4/2015 | Lin | ..................... | F02D 41/1466 |
| | | | | 73/28.01 |
| 2015/0145329 A1* | 5/2015 | Okashita | ................. | H02J 9/061 |
| | | | | 307/23 |
| 2015/0155669 A1* | 6/2015 | Chamberlain | ........ | H04W 88/08 |
| | | | | 455/561 |
| 2015/0234399 A1* | 8/2015 | Chamberlain | ......... | H02H 9/045 |
| | | | | 455/561 |
| 2015/0234405 A1* | 8/2015 | Chamberlain | ............ | G05F 1/62 |
| | | | | 455/572 |
| 2015/0270637 A1* | 9/2015 | Islam | ................... | H01R 13/518 |
| | | | | 439/533 |
| 2015/0270654 A1* | 9/2015 | Islam | ................... | H01R 13/518 |
| | | | | 439/529 |
| 2015/0326317 A1* | 11/2015 | Michaelis | ............ | H04B 10/807 |
| | | | | 398/115 |
| 2016/0082849 A1* | 3/2016 | Yamasaki | ................. | B60L 1/00 |
| | | | | 290/3 |
| 2016/0316430 A1* | 10/2016 | Fischer | ...................... | H02J 1/10 |
| 2016/0342168 A1* | 11/2016 | Chamberlain | ............. | G05F 1/62 |
| 2017/0033331 A1* | 2/2017 | Chamberlain | ...... | H01M 10/054 |
| 2017/0155364 A1* | 6/2017 | Zhang | .................. | H03F 1/0222 |
| 2017/0168513 A1* | 6/2017 | Chamberlain | ......... | H02H 9/045 |
| 2017/0230906 A1* | 8/2017 | Chamberlain | ............ | H04B 3/548 |
| 2017/0277214 A1* | 9/2017 | Forbes, Jr. | ............. | G01D 4/004 |
| 2017/0336585 A1* | 11/2017 | Chamberlain | ......... | H01Q 1/246 |

* cited by examiner

METHODS AND EQUIPMENT FOR PROVIDING BACKUP POWER IN CELLULAR BASE STATIONS

CROSS-REFERENCE TO RELATED APPLICATION

The present application claims priority to U.S. Provisional Patent Application Ser. No. 62/334,753, filed May 11, 2016, the entire content of which is incorporated by reference herein as if set forth in its entirety.

FIELD OF THE INVENTION

The present invention relates generally to cellular communications systems and, more particularly, to power supply systems for cellular base stations.

BACKGROUND

Cellular base stations typically include, among other things, a radio, a baseband unit, and one or more antennas. The radio receives digital information and control signals from the baseband unit and modulates this information into a radio frequency ("RF") signal that is transmitted through the antennas. The radio also receives RF signals from the antenna and demodulates these signals and supplies them to the baseband unit. The baseband unit processes demodulated signals received from the radio into a format suitable for transmission over a backhaul communications system. The baseband unit also processes signals received from the backhaul communications system and supplies the processed signals to the radio. A power supply may also be provided that generates suitable direct current ("DC") power signals for powering the baseband unit and the radio. For example, the radio is often powered by a (nominal) 48 Volt DC power supply in cellular systems that are currently in use today. A battery backup is also typically provided to maintain service for a limited period of time during power outages.

In order to increase coverage and signal quality, the antennas in many cellular base stations are located at the top of an antenna tower, which may be, for example, about fifty to two hundred feet tall. Antennas are also routinely mounted on other elevated structures such as, for example, buildings, utility poles and the like. Until fairly recently, the power supply, baseband unit and radio were all located in an equipment enclosure at the bottom of the antenna tower or other elevated structure to provide easy access for maintenance, repair and/or later upgrades to the equipment. Coaxial cable(s) were routed from the equipment enclosure to the top of the antenna tower and were used to carry RF signals between the radios and the antennas.

FIG. 1 is a schematic diagram that illustrates a conventional cellular base station 10. As shown in FIG. 1, the depicted cellular base station 10 includes an equipment enclosure 20 and an antenna tower 30. The equipment enclosure 20 is typically located at the base of the antenna tower 30, as shown in FIG. 1. A baseband unit 22, a radio 24 and a power supply 26 are located within the equipment enclosure 20. The baseband unit 22 may be in communication with a backhaul communications system 44. A plurality of antennas 32 (e.g., three sectorized antennas 32-1, 32-2, 32-3) are located at the top of the antenna tower 30. Three coaxial cables 34 (which are bundled together in FIG. 1 to appear as a single cable) connect the radio 24 to the antennas 32. The antennas 32 are passive (unpowered) devices and hence none of the equipment at the top of the tower 30 requires electrical power. While the cellular base station 10 of FIG. 1 (and various other cellular base stations shown in subsequent figures) is shown as a having a single baseband unit 22 and radio 24 to simplify the drawings and description, it will be appreciated that cellular base stations routinely have multiple baseband units 22 and radios 24 (and additional antennas 32), with three or more baseband units 22 and radios 24 being common in state-of-the-art systems. There is a practical limit, however, to the number of devices that can be housed in the enclosure 20.

In recent years, a shift has occurred and the radio 24 is now more typically located at the top of the tower 30 in new or upgraded cellular installations. Radios that are located at the top of the tower 30 are typically referred to as remote radio units or remote radio heads ("RRH") 24'. Using remote radio heads 24' may significantly improve the quality of the cellular data signals that are transmitted and received by the cellular base station, as the use of remote radio heads 24' may reduce signal transmission losses and noise that can occur in the transmission line between the radios 24 and the antennas 32. In particular, as the coaxial cables 34 that connect radios 24 that are located at the base of an antenna tower 30 to antennas 32 that are mounted near the top of the antenna tower 30 may have lengths of 100-200 feet or more, the signal loss that occurs in transmitting signals at cellular frequencies (e.g., 1.8 GHz, 3.0 GHz, etc.) over these coaxial cables 34 may be significant, as at these frequencies the coaxial cables 34 tend to radiate RF signal energy. Because of this loss in signal power, the signal-to-noise ratio of the RF signals may be degraded in systems that locate the radio 24 at the bottom of the antenna tower 30 as compared to cellular base stations having remote radio heads 24' that are located at the top of the tower 30 next to the antennas 32 (note that signal losses in the cabling connection between the baseband unit 22 at the bottom of the tower 30 and the remote radio head 24' at the top of the tower 30 may be much smaller, as these signals are transmitted at baseband or intermediate frequencies as opposed to RF frequencies, and because these signals may be transmitted up the antenna tower 30 over fiber optic cables, which may exhibit lower losses).

FIG. 2 is a schematic diagram that illustrates a cellular base station 10' according to this newer architecture. As shown in FIG. 2, the baseband unit 22 and the power supply 26 may still be located at the bottom of the tower 30 in the equipment enclosure 20. The radio 24, in the form of a remote radio head 24', is located at the top of the tower 30 immediately adjacent to the antennas 32. While the use of tower-mounted remote radio heads 24' may improve signal quality, it also requires that DC power be delivered to the top of the tower 30 to power the remote radio head 24'. As shown in FIG. 2, typically a fiber optic cable 38 connects the baseband unit 22 to the remote radio head 24' (as fiber optic links may provide greater bandwidth and lower loss transmissions), and a separate or combined ("composite") power cable 36 is provided for delivering the DC power signal to the remote radio head 24'. The separate power cable 36 is typically bundled with the fiber optic cable 38 so that they may be routed up the tower 30 together. In other cases (not shown), a hybrid fiber optic/power trunk cable 40 may be run up the tower 30. Such trunk cables 40 typically have junction enclosures on either end thereof, and a first set of data and power jumper cables are used to connect the junction enclosure on the ground end of the trunk cable 40 to the baseband unit(s) 22 and power supply 26, and a second set of data and power (or combined data/power)

jumper cables are used to connect the junction enclosure at the top of the tower 30 to the remote radio heads 24'.

Another change that has occurred in the cellular industry is a rapid increase in the number of subscribers, as well as a dramatic increase in the amount of voice and data traffic transmitted and received by a typical subscriber. In response to this change, the number of remote radio heads 24' and antennas 32 that are being mounted on a typical antenna tower 30 has also increased, with twelve remote radio heads 24' and twelve or more antennas 32 being a common configuration today.

Moreover, because of the desire to provide network coverage over a large geographic area, cellular base stations are often located in relatively remote locations. In order to ensure continuity of service in the event of a power outage, cellular base stations may be provided with a backup battery 43 that can supply DC power in the event an external power supply, such as an AC line voltage, is interrupted. As illustrated in FIG. 2, the backup battery 43 may be physically located in the enclosure 20 and may be connected to the power supply 26. When the power supply 26 detects a loss of AC line power, the power supply may supply the DC signal from the battery 43 to the RRH 24' over the cable 40.

In addition, other types of radio equipment, such as terrestrial microwave (TMW) radios 25, may be co-located on a cellular antenna tower 30 along with the remote radio heads 24'. This equipment also receives power from the power supply 26. Remote radio heads 24', terrestrial microwave transceivers 25, and other powered equipment that may be located on a tower 30 are generally referred to herein as "tower top equipment" or TTE.

SUMMARY

Some embodiments of the present inventive concept are directed to a load accumulator for a cellular base station antenna comprising a plurality of input terminals configured to receive a plurality of input voltages, a plurality of output terminals configured to be coupled to a respective plurality of tower top equipment and configured to supply output voltages to the tower top equipment, a plurality of switches coupled to respective ones of the plurality of input terminals and the plurality of output terminals; a voltage sensor coupled to at least one input terminal of the plurality of input terminals and configured to sense a level of one of the plurality of input voltages received at the at least one input terminal, a supplemental input terminal configured to receive a supplemental voltage, and a control logic coupled to the voltage sensor and to the plurality of switches and configured to detect that the supply voltage supplied to the at least one input terminal has fallen below a threshold voltage, and in response to detecting that the supply voltage supplied to the at least one of the plurality of input terminals has fallen below the threshold voltage, to supply the supplemental voltage to a respective one of the plurality of output terminals.

In other embodiments, wherein the control logic is configured to add the supplemental voltage to the input voltage supplied to the at least one of the plurality of input terminals to form a combined output voltage and to supply the combined output voltage to the respective one of the plurality of output terminals.

In other embodiments, the control logic is configured to increase a level of the supplemental voltage over time so that the combined voltage remains stable as the input voltage supplied to the at least one of the plurality of input terminals drops over time.

In other embodiments, the control logic is configured to supply the supplemental voltage alone to the respective one of the plurality of output terminals.

In other embodiments, the load accumulator further comprises a plurality of voltage sensors coupled to respective ones of the plurality of input terminals.

In other embodiments, the load accumulator further comprises a DC-DC voltage converter configured to receive a high voltage input voltage and output a low voltage output voltage as the supplemental voltage.

In other embodiments, the plurality of tower top equipment comprises a remote radio head and/or a terrestrial microwave transceiver.

In other embodiments, the load accumulator further comprises an auxiliary power supply coupled to the supplemental input terminal and configured to supply the supplemental input voltage.

In other embodiments, the auxiliary power supply comprises a battery and a trickle charger coupled to the battery.

In other embodiments, the load accumulator further comprises a resistance detector coupled to the plurality of input terminals and configured to measure a resistance of input lines coupled to the plurality of input terminals.

In other embodiments, the switch comprises a diode switch including a first diode having an cathode connected to the at least one input terminal and a second diode having a cathode connected to the supplemental input terminal, wherein the first and second diodes each include an anode coupled together and to the respective one of the plurality of output terminals.

In other embodiments, the load accumulator further comprises a variable voltage boost power supply coupled to the supplemental input terminal.

Further embodiments of the inventive concept are directed to a backup power system for a cellular base station antenna comprising an auxiliary voltage source and a load accumulator. The load accumulator comprises an input terminal configured to receive an input voltage, an output terminal configured to be coupled to a tower top equipment and configured to supply an output voltage to the tower top equipment, a switch coupled to the input terminal and the output terminal, a voltage sensor coupled to at least one input terminal of the plurality of input terminals and configured to sense a level of the input voltage received at the input terminal, a supplemental input terminal coupled to the auxiliary voltage source and configured to receive a supplemental voltage from the auxiliary voltage source, and a control logic coupled to the voltage sensor and to the switch and configured to detect that the supply voltage supplied to the input terminal has fallen below a threshold voltage, and in response to detecting that the supply voltage supplied to the input terminal has fallen below the threshold voltage, to supply the supplemental voltage to the output terminal.

In further embodiments, the auxiliary voltage source comprises a backup battery and a trickle charger coupled to the backup battery.

In further embodiments, the auxiliary voltage source comprises a high voltage source configured to generate a high voltage DC signal. The backup power system further comprises a step down voltage converter configured to receive the high voltage DC signal from the high voltage source, to generate the supplemental voltage having a lower voltage than the high voltage DC signal in response to the high voltage DC signal, and to supply the supplemental voltage to the supplemental input terminal.

Other embodiments of the inventive concept provide a method of supplying power to a tower top equipment (TTE)

mounted on an antenna tower comprising detecting a power supply voltage that is supplied to the TTE by a power supply line that extends from a ground mounted power supply to the TTE on the antenna tower, comparing the power supply voltage to a threshold voltage associated with the TTE, and in response to comparing the power supply voltage to the threshold voltage associated with the TTE, supplying an auxiliary voltage to the TTE.

In other embodiments, the method further comprises adding the auxiliary voltage to the power supply voltage to form a combined voltage and supplying the combined voltage to the TTE.

In other embodiments, the method further comprises increasing a level of the auxiliary voltage as the power supply voltage decreases so that the combined voltage remains relatively constant.

In other embodiments, supplying the auxiliary voltage comprises supplying the auxiliary voltage from an auxiliary backup battery mounted on the tower.

In other embodiments, supplying the auxiliary voltage comprises generating a high voltage at a ground mounted backup power source; supplying the high voltage to a tower mounted voltage converter; and converting the high voltage to the auxiliary voltage at the tower mounted voltage converter.

It is noted that aspects of the invention described with respect to one embodiment, may be incorporated in a different embodiment although not specifically described relative thereto. That is, all embodiments and/or features of any embodiment can be combined in any way and/or combination. These and other objects and/or aspects of the present invention are explained in detail in the specification set forth below.

BRIEF DESCRIPTION OF THE DRAWINGS

The accompanying figures are included to provide a further understanding of the present inventive concept, and are incorporated in and constitute a part of this specification. The drawings illustrate some embodiments of the present inventive concept and, together with the description, serve to explain principles of the present inventive concept.

DETAILED DESCRIPTION

Pursuant to various embodiments, methods for delivering supplemental or DC power to tower top equipment, such as a remote radio head ("RRH"), of a cellular base station are provided, along with related cellular base stations and other equipment. These methods, systems, and equipment may enable equipment that is mounted on a cellular base station antenna tower to operate for a longer period of time following failure of a primary power source than may otherwise be possible. Some methods, systems, and equipment may reduce the power loss associated with delivering a DC power signal to the radio equipment at the top of the tower. Although some embodiments are described herein in regard to an RRH, it will be appreciated that the systems/methods described herein can be used to power any type of tower top equipment.

The DC voltage of a power signal that is supplied to a remote radio head from a power supply located at the base of a tower 30 over a power cable may be determined as follows:

$$V_{RRH}=V_{PS}-V_{Drop} \quad [1]$$

where $V_{RRH}$ is the DC voltage of the power signal delivered to the remote radio head, $V_{PS}$ is the DC voltage of the power signal that is output by the power supply, and $V_{Drop}$ is the decrease in the DC voltage that occurs as the DC power signal traverses the power cable connecting the power supply to the remote radio head. For a typical base station installation, $V_{Drop}$ is generally about 4 volts.

Typically, a minimum required voltage for the power signal, a nominal or recommended voltage for the power signal and a maximum voltage for the power signal will be specified for the remote radio head. Thus, the power supply at the base of the tower must output a voltage $V_{PS}$ such that $V_{RRH}$ will be between the minimum and maximum specified voltages for the power signal of the remote radio head. Conventionally, the voltage output of the power signal by the power supply ($V_{PS}$) is set to ensure that a power signal having the nominal specified voltage is supplied to the remote radio head (or at least a value above the minimum required voltage for the power signal) when the remote radio head draws the maximum anticipated amount of current from the power supply.

Figure 1:
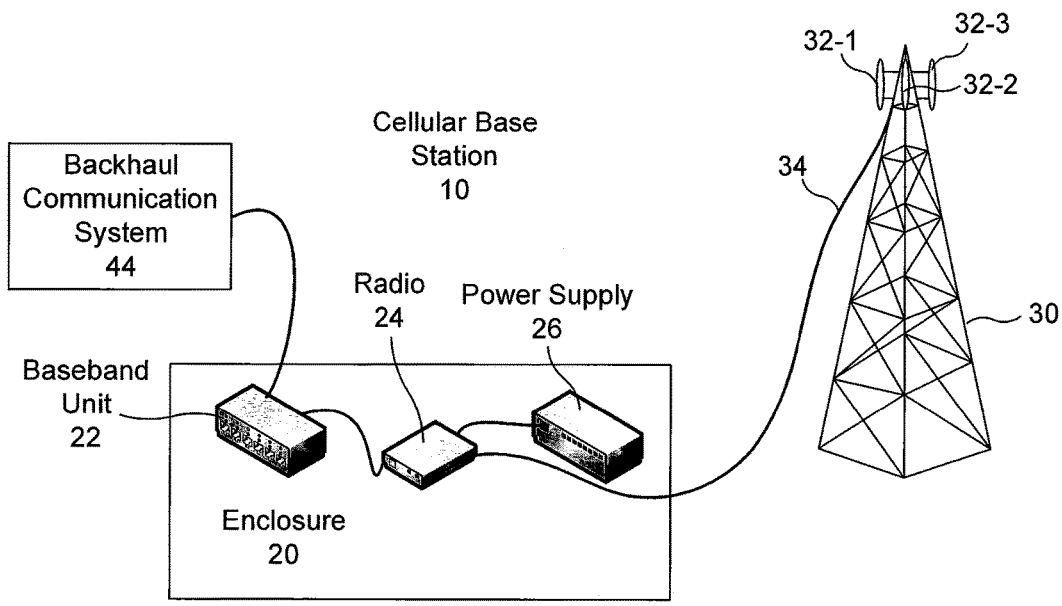
FIG. 1 is a simplified, schematic view of a traditional cellular base station architecture.
Figure 2:
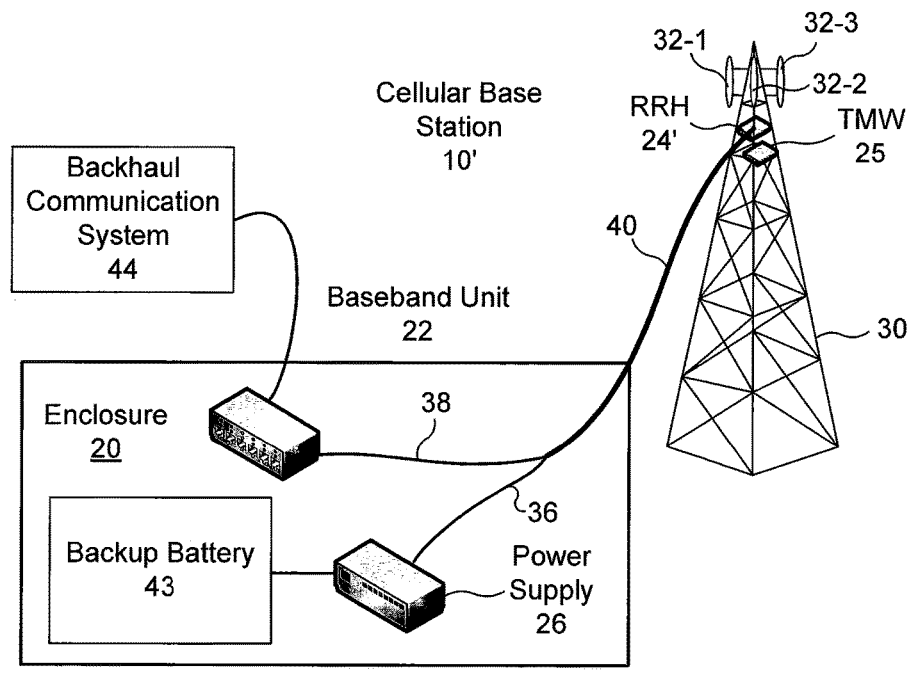
FIG. 2 is a simplified, schematic view of a conventional cellular base station in which a remote radio head is located on the antenna tower.
Figure 3:
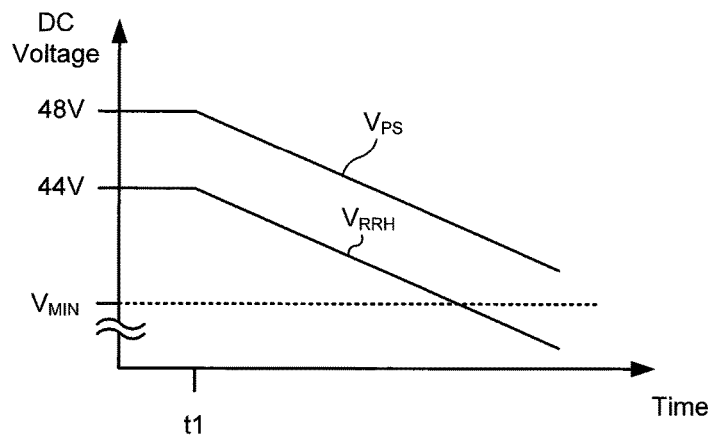
FIG. 3 is a simplified, schematic graph of a level of a backup voltage supplied to tower top equipment mounted on an antenna tower.

As noted above, cellular base stations are often located in relatively remote locations. In order to ensure continuity of service in the event of a power outage, cellular base stations are often provided with a backup battery that can supply DC power in the event an external power supply, such as an AC line voltage, is interrupted. Batteries are capable of storing a finite amount of energy, however, and as the battery is discharged, the voltage output by the battery tends to decrease over time, as illustrated in FIG. 3. For example, referring to FIG. 3, a ground-located backup battery may maintain an output voltage of 48V while a power supply is receiving an AC line voltage. If the AC line voltage is lost at time t1, the base station power supply may switch to battery backup and thereafter output 48 volts from the backup battery to the RRH. Due to the voltage drop $V_{Drop}$, however, the voltage $V_{RRH}$ actually delivered to the RRH may initially only be about 44 volts. Moreover, as the backup battery discharges over time, the voltage $V_{RRH}$ delivered to the RRH drops even more. If the voltage $V_{RRH}$ delivered to the RRH drops below the minimum operating voltage ($V_{MIN}$) of the RRH, the RRH may be forced to shut down, which may result in some loss of network coverage.

Some embodiments of the inventive concepts provide a load accumulator that resides on the tower proximate the RRH and other tower top equipment (TTE). The load accumulator monitors the voltage provided to each TTE and selectively provides supplemental power to each TTE on an as-needed basis. The supplemental power may be provided from one of a number of auxiliary power sources, including a tower-mounted auxiliary battery or other auxiliary power source. The supplemental power may be provided to the TTE in addition to or instead of power supplied by the ground-located backup battery.

Embodiments will now be discussed in more detail with reference to FIGS. 4-14, in which example embodiments of load accumulators and related circuits/devices are shown.

Figure 4:
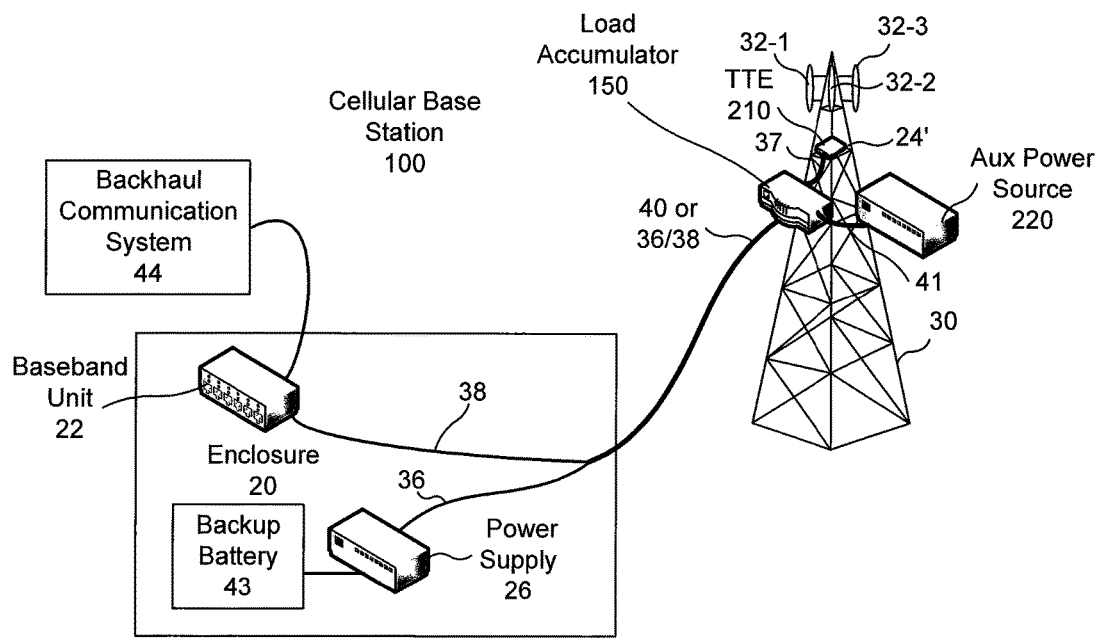
FIG. 4 is a simplified, schematic view of a cellular base station including a load accumulator according to embodiments.

FIG. 4 is a schematic block diagram of a cellular base station 100 according to embodiments. As shown in FIG. 4, the cellular base station 100 includes an equipment enclosure 20 and a tower 30. The tower 30 may be a conventional antenna or cellular tower or may be another structure such as a utility pole or the like. A baseband unit 22 and a power supply 26 are located within the equipment enclosure 20. A tower top equipment, TTE, 210 which may include one or more remote radio heads 24', terrestrial microwave transceivers, etc., and plurality of antennas 32 (including, e.g., three sectorized antennas 32-1, 32-2, 32-3) are mounted on the tower 30, typically near the top thereof.

The remote radio head 24' receives digital information and control signals from the baseband unit 22 over a fiber optic cable 38 that is routed from the enclosure 20 to the top of the tower 30. The remote radio head 24' modulates this information into an RF signal at the appropriate cellular frequency that is then transmitted through one or more of the antennas 32. The remote radio head 24' also receives RF signals from one or more of the antennas 32, demodulates these signals, and supplies the demodulated signals to the baseband unit 22 over the fiber optic cable 38. The baseband unit 22 processes the demodulated signals received from the remote radio head 24' and forwards the processed signals to the backhaul communications system 44. The baseband unit 22 also processes signals received from the backhaul communications system 44 and supplies them to the remote radio head 24'. Typically, the baseband unit 22 and the remote radio heads 24' each include optical-to-electrical and electrical-to-optical converters that couple the digital information and control signals to and from the fiber optic cable 38.

Also provided on the tower 30 are a load accumulator 150 and an auxiliary power source 220 coupled to the load accumulator 150. The power supply 26 generates one or more DC power signals. A power cable 36 is connected to the output of the power supply 26 and is bundled together with the fiber optic cable 38 so that the two cables 36, 38 may be routed up the tower 30 as an integral unit. In other embodiments, a hybrid power/fiber optic trunk cable 40 may be routed up the tower 30, and jumper cables may be connected between each end of the trunk cable 40 and the baseband units 22, power supply 28 and the load accumulator 150. In such embodiments, the power jumper cables and the power portion of the trunk cable 40 comprise the power cable 36. In some embodiments, a separate power cable 36 may be provided for each TTE 210 mounted on the antenna 30, with each of the power cables being connected to the load accumulator 150. Each power cable may include two conductors, namely, a power conductor and a ground conductor. Separate power cables 37 are provided from the load accumulator 150 to each of the respective TTEs 210.

State-of-the-art remote radio heads 24' are often designed to be powered by a 48 Volt (nominal) DC power signal. While the minimum DC power signal voltage at which the remote radio head 24' will operate and the maximum DC power signal voltage that may be provided safely to the remote radio head 24' without the threat of damage to the remote radio head 24' vary, typical values are a 38 Volt minimum DC power signal voltage and a 56 Volt maximum DC power signal voltage. Thus, according to embodiments, the power supply 26 may be designed to deliver a DC power signal having a relatively constant voltage of, for example, about 48 Volts at the far end of the power cable 36.

Figure 5:
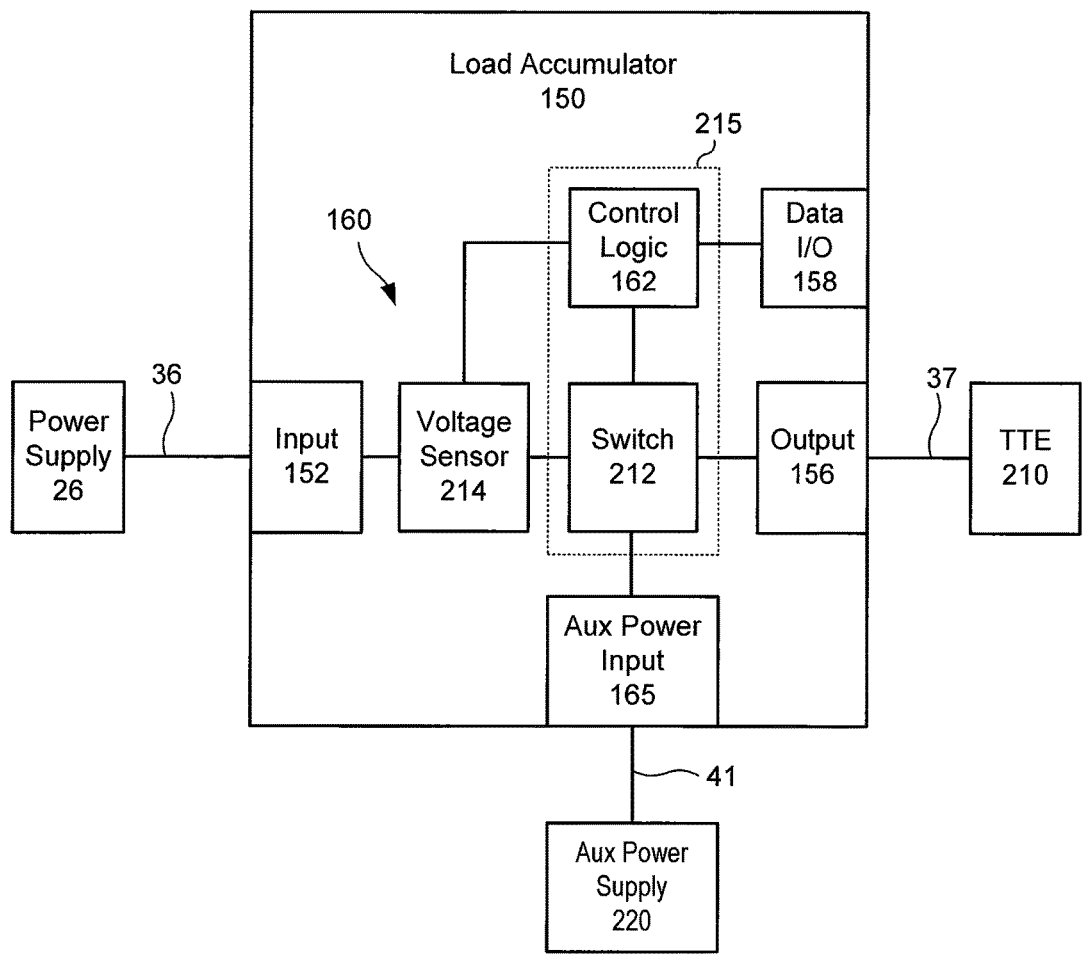
FIG. 5 is a simplified, schematic block diagram of a load accumulator according to embodiments.

A simplified schematic diagram of a load accumulator 150 according to some embodiments is illustrated in FIG. 5. A load accumulator 150 includes an input/output chain 160 including an input port 152 coupled to a power cable 36 that runs from the power supply 26, an output port coupled to a power cable 37 that runs to a TTE 210, a voltage sensor 214 senses a voltage level of the voltage supplied to the input port 152, and a switch 212 that is coupled to the output port 156. An auxiliary power input port 165 receives an auxiliary input voltage from an auxiliary power supply 220 and supplies the auxiliary input voltage to the switch 212. A control logic circuit 162 receives a voltage sense signal from the voltage sensor 214 and responsively controls the switch 212. The control logic circuit 162 may include a microprocessor, an ASIC, or other logic circuitry. The control logic circuit 162 is configured to cause the switch 212 selectively supply the auxiliary voltage signal to the output port 156 based on a voltage level of the voltage signal received at the input port 152. For example, the control logic 162 may cause the switch 212 to supply auxiliary power to the TTE 210 when the voltage level of the signal received at the input port 152 drops below a predetermined threshold level, $V_{Thresh}$. The control logic 162 and switch 212 may be combined into a single logic/switch circuit 215. The voltage sensor 214 may optionally include a resettable over-voltage and/or over-current protection circuit therein.

In some embodiments, the auxiliary voltage signal may be added to the input voltage provided at the input port 152 to provide a combined voltage, and the combined voltage may be supplied to the output port 156. Such embodiments are referred to herein as "additive auxiliary backup" approaches. In other embodiments, the auxiliary voltage signal may be supplied to the output port 156 instead of the input voltage that is received at the input port 152. Such embodiments are referred to herein as "replacement auxiliary backup" approaches.

Although a single input/output chain 160 is illustrated in the load accumulator 150, it will be appreciated that the load accumulator may include a plurality of input/output chains. In particular, one input/output chain 160 may be provided for each TTE 210 served by the load accumulator 150. In addition, although the control logic 162 is illustrated as residing within the input/output chain 160, the control logic 162 may be separate from the input/output chain 160. That is, while in some embodiments (such the embodiments illustrated in FIG. 5) each input/output chain 160 in the load accumulator 150 may include a dedicated control logic 162, in other embodiments, a single control logic 162 may control multiple input/output chains 160.

The load accumulator 150 may further include a data input/output (I/O) port 158 coupled to the control logic, which facilitates communications with load accumulator 150 by an external control device.

Figure 6:
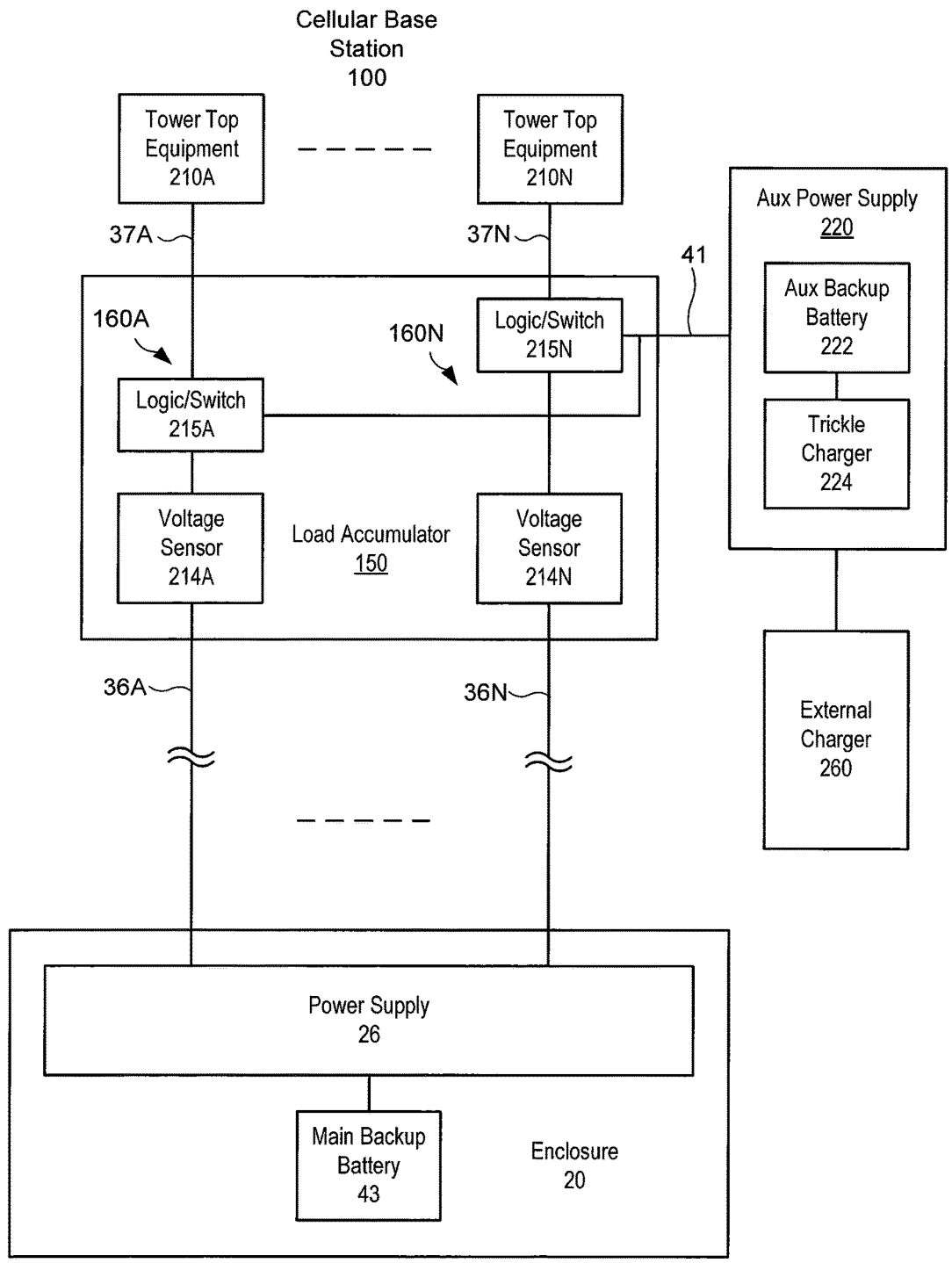
FIG. 6 is a simplified, schematic block diagram of a cellular base station according to some embodiments.

FIG. 6 is a simplified schematic diagram that illustrates a base station antenna system including a load accumulator 150 according to some embodiments. Referring to FIG. 6, the base station antenna system includes an enclosure 20 located at a base of an antenna tower. The enclosure 20 contains a main power supply 26 and a main backup battery 43. A plurality of power cables 36A-36N extend from the main power supply 26 up the antenna tower and connect to a load accumulator 150 that is mounted on the antenna tower. The load accumulator 150 is coupled to a plurality of tower top equipment 210-210N, which may include remote radio heads, terrestrial microwave transceivers, etc. The load accumulator 150 is connected to the TTE 210A-210N through respective power cables 37A-37N. An auxiliary power supply 220, which is also mounted on the antenna tower along with the load accumulator 150 and the TTE 210A-210N, is coupled to the load accumulators 150 through an auxiliary power cable 41.

In the embodiments illustrated in FIG. 6, the auxiliary power supply 220 includes an auxiliary backup battery 222 and a trickle charger 224. During normal operation, the auxiliary power supply 220 may draw power to charge the auxiliary backup battery 222 from one of the power cables 36A-36N. Alternatively, a separate power cable (not shown) may provide power from the main power supply 26 to the auxiliary power supply 220. The trickle charger 224 maintains a predetermined charge level on the auxiliary backup battery 222.

The load accumulator 150 includes a plurality of input/output paths 160A-160N, each of which includes a logic/switch circuit 215A-215N and a voltage sensor 214A-214N. Each of the logic/switch circuits 215A-215N is coupled to the power cable 41 that is connected to the auxiliary power supply 220.

Each of the logic/switch circuits 215 can be configured to supply auxiliary power from the auxiliary power supply 220 to a particular TTE 210 when the voltage supplied by the main power supply 26 drops to or below a predetermined threshold. Moreover, the predetermined threshold may be set at a different level for each of the logic/switch circuits 215. In that manner, the load accumulator 150 may provide supplemental power to each TTE 210 only when it is required by the TTE 210. For example, various different ones of the TTE 210 may have different minimum voltage requirements. Thus, it may not be necessary to supply supplemental power to all of the TTE 210 at the same time. For example, the logic/switch circuits 215A-215N may cause the respective switches 212A-212N to supply auxiliary power to the TTE 210A-210N when the voltage level of the signal received at the input port 152 drops to or below a predetermined threshold level, $V_{Thresh}$, which may be set at a different level for each of the logic/switch circuits 215A-215N.

As further illustrated in FIG. 6, an external charger 260 may be coupled to the auxiliary power supply 220, and may supply external power to the auxiliary power supply 220 that may be used to power the trickle charger 224. The external charger may include, for example, a wind turbine, a solar cell, a fuel cell, etc.

Figure 7:
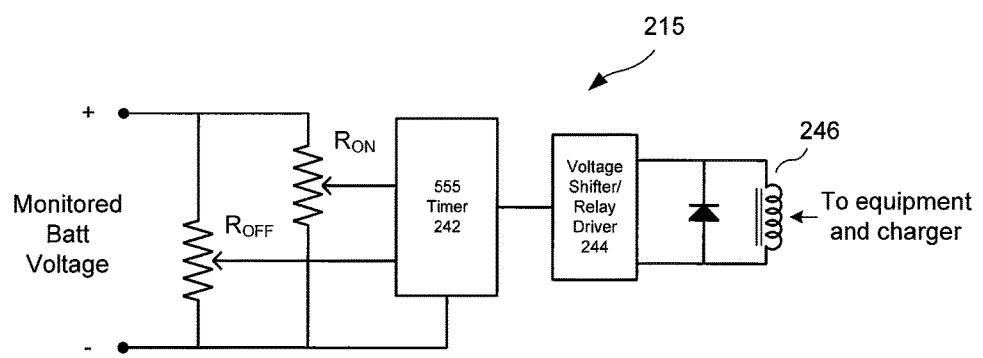
FIG. 7 is a simplified, schematic diagram of a voltage detection circuit that can be used with a load accumulator according to some embodiments.

FIG. 7 illustrates a logic/switch circuit 215 according to some embodiments. The logic/switch circuit includes a monitored voltage input that is provided to a pair of variable voltage divider resistors $R_{ON}$, $R_{OFF}$. The outputs of the variable voltage divider resistors are provided to a 555 timer 242, which generates a control signal when the input voltage falls below a threshold voltage determined by a setting of one of the variable voltage divider resistors, e.g., $R_{OFF}$. The control signal is output to a voltage shifter/relay driver, which responsively actuates a relay 246, which causes the auxiliary power to be supplied to the TTE.

Figure 8A:
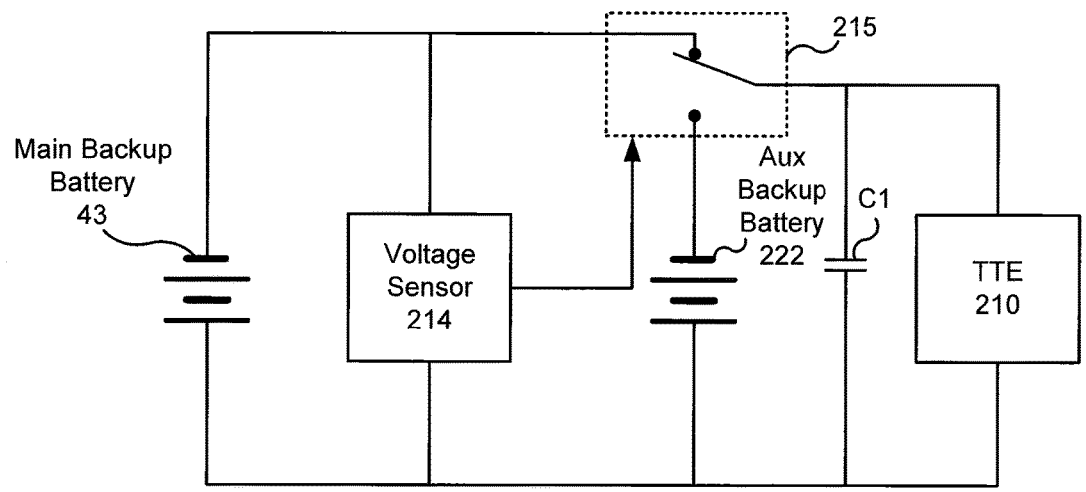
FIGS. 8A to 8F are simplified, schematic block diagrams of load accumulator circuits according to various embodiments.

FIGS. 8A to 8E illustrate electrical configurations of logic/switch circuits 215 according to various embodiments. Referring to FIG. 8A, a logic/switch circuit 215 includes a single pole, dual throw make-before-break switch that selectively couples either the main backup battery 43 or the auxiliary backup battery 222 to the TTE 210 in response to an output signal generated by the voltage sensor 214 that measures the level of voltage supplied by the main backup battery 43. That is, the embodiment of FIG. 8A illustrates a replacement auxiliary backup approach.

Because the switch is a make-before-break switch, the TTE 210 is coupled to the auxiliary backup battery 222 before it is decoupled from the main backup battery 43. Thus, the TTE 210 may not experience a brief loss of power during the switching operation.

The logic/switch circuit 215 monitors the voltage supplied by the main backup battery 43, and when the voltage gets close to the dropout voltage of the TTE 210, the logic/switch circuit 215 switches the TTE 210 to the auxiliary backup battery 222. A capacitor C1 may be provided in parallel with the auxiliary backup battery 222 to reduce transient fluctuations of voltage supplied to the TTE 210 during the switching event. The threshold voltage $V_{Thresh}$ of the voltage supplied by the main backup battery 43 at which switching occurs can be set for each individual TTE 210.

Figure 8B:
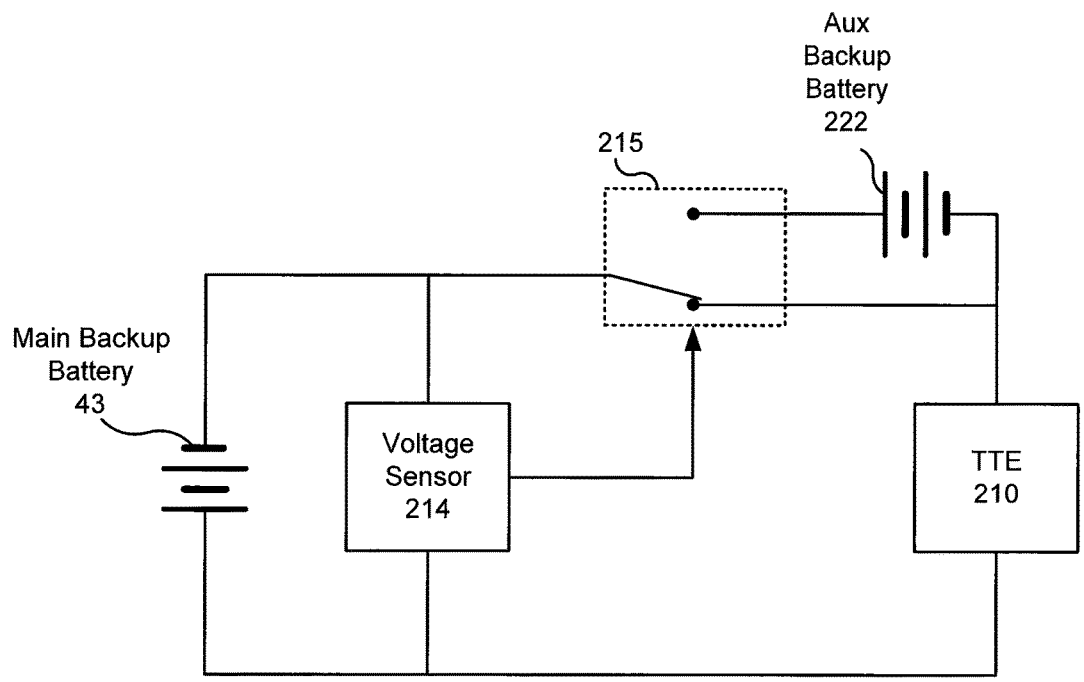

FIG. 8B illustrates an embodiment in which the logic/switch circuit 215 adds the voltage of the auxiliary backup battery 222 to the voltage supplied by the main backup battery 43 to form a combined voltage, which is supplied to the TTE 210. Accordingly, the embodiment of FIG. 8B illustrates an additive auxiliary backup approach. In the embodiment illustrated in FIG. 8B, the logic/switch circuit 215 includes a make-before-break switch that selectively couples the TTE 210 to either the main backup battery 43 or to a circuit including the main backup battery 43 in series with the auxiliary backup battery 222 in response to the output of the voltage sensor 214.

Figure 11:
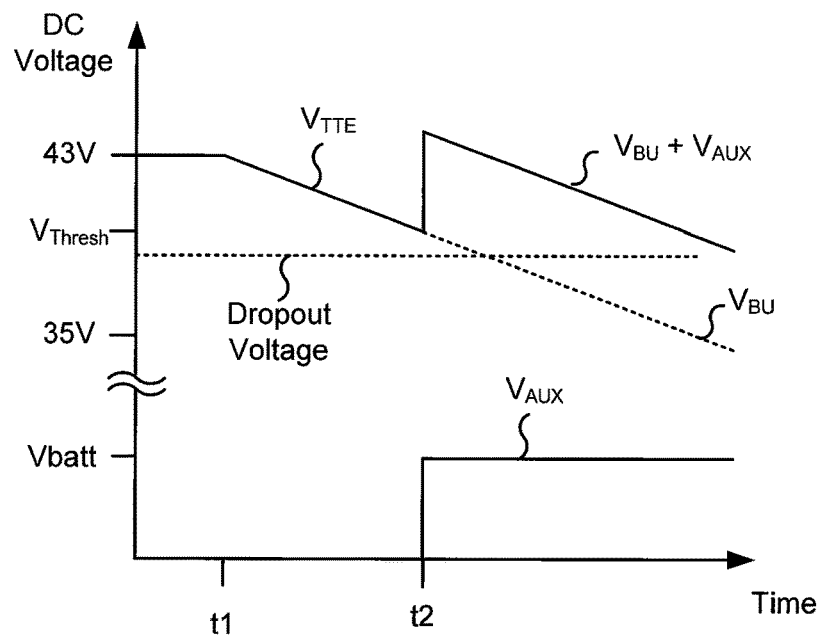
FIG. 11 is a simplified, schematic graph of a level of an auxiliary backup voltage supplied to tower top equipment mounted on an antenna tower according to some embodiments.

FIG. 11 schematically illustrates various voltages that may be generated during operation of the circuit of FIG. 8B. In particular, FIG. 11 is an example graph of voltage versus time that illustrates the voltage $V_{TTE}$ supplied to a TTE 210. Referring to FIG. 8B and FIG. 11, a voltage $V_{TTE}$ of about 43V is supplied to the TTE 210 during normal operation. At time t1, line power is lost, and the main backup battery 43 begins to supply DC power to the TTE 210 in the form of a backup battery signal $V_{BU}$. Because battery power is being supplied, the backup battery signal $V_{BU}$ decreases over time. As the voltage supplied to the TTE 210 drops close to the dropout voltage of the TTE 210, at time t2, the logic/switch circuit 215 switches the auxiliary backup battery 222 into series with the main backup battery 43. The voltage supplied to the TTE 210 then becomes equal to $V_{BU}+V_{AUX}$, where $V_{AUX}$ is the voltage output by the auxiliary backup battery.

The voltage supplied to the TTE 210 may thereby remain above the TTE dropout voltage for a longer period of time. Although the voltage $V_{AUX}$ supplied by the auxiliary backup battery 222 is illustrated as constant, it will be appreciated that the voltage $V_{AUX}$ may also decrease over time.

Figure 8C:
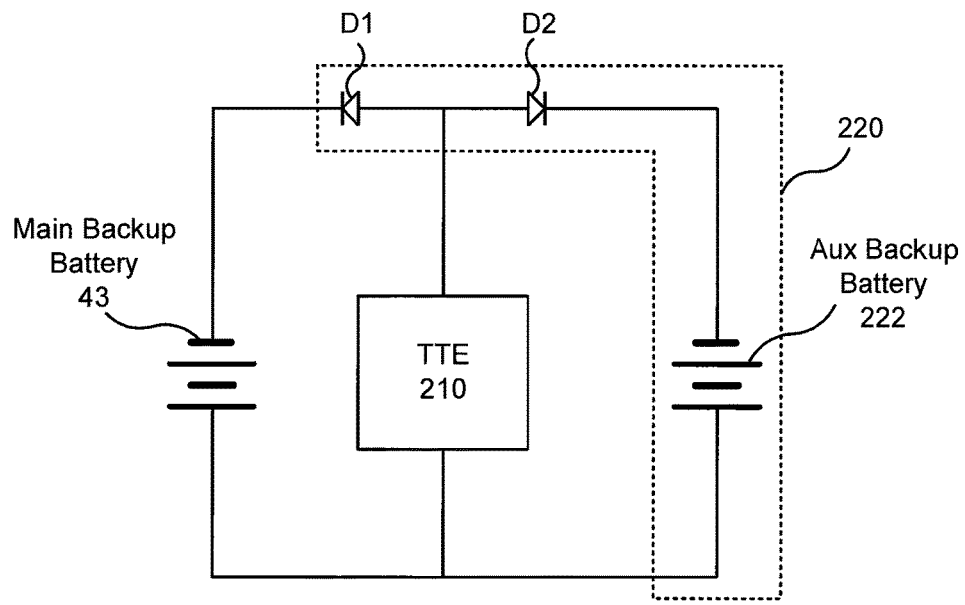

FIG. 8C illustrates an auxiliary power supply 220 including a diode switch circuit. The overlapping voltage adder circuit includes first and second diodes D1, D2 having anodes connected to the TTE 210 and cathodes connected to negative terminals of the main backup battery 43 and the auxiliary backup battery 222, respectively. The main backup battery 43 will solely power the TTE 210 until the voltage level supplied by the main backup battery 43 drops to the point where both diodes are biased to carry current. Eventually, the voltage supplied by the main backup battery 43 to the TTE 210 will drop to the point where the diode D1 is no longer biased on, and the auxiliary battery provides power to the TTE 210. Note that in the embodiment of FIG. 8C, neither a voltage sensor nor a logic circuit is required.

Figure 8D:
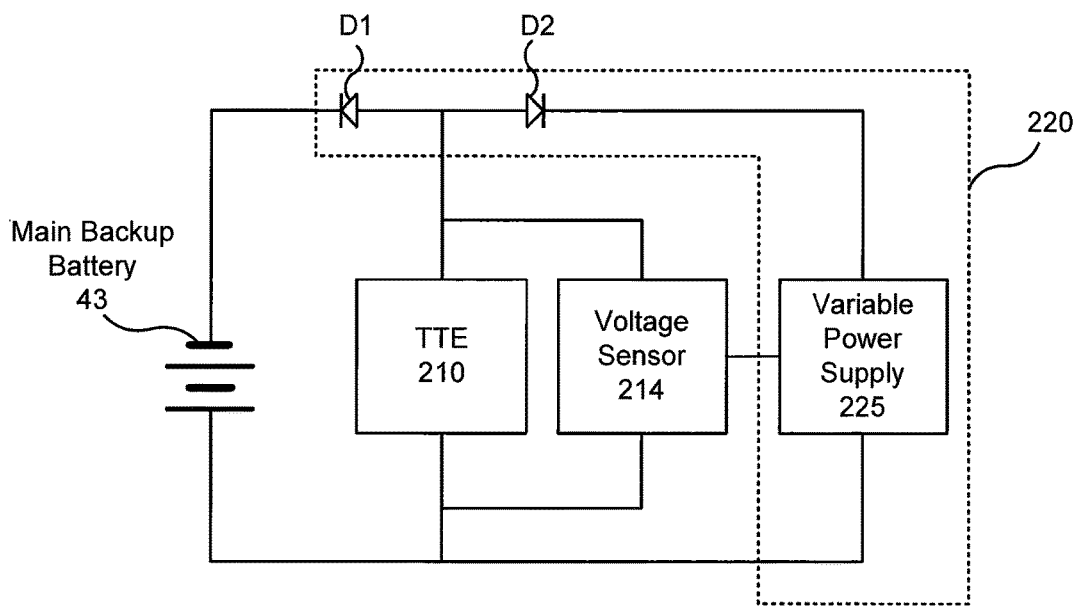
Figure 12:
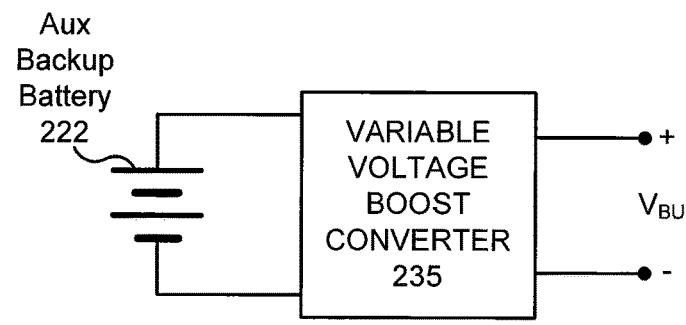
FIG. 12 is a simplified, schematic block diagram of a variable voltage boost converter according to some embodiments.

FIG. 8D illustrates an auxiliary power supply 220 including a diode switch circuit that is similar to the circuit of FIG. 8C, except that a variable power supply 225 is provided along with a voltage sensor 214. The auxiliary power supply 220 of FIG. 8D is similar to the auxiliary power supply 220 of FIG. 8C, except that the variable power supply 225 can supply a variable voltage, which can increase efficiency of operation of the load accumulator after turn-on. The variable power supply 225 can also be configured to turn on at a variable value depending on the needs of the TTE 210. A variable power supply 225 is illustrated in FIG. 12, and may include an auxiliary backup battery 222 and a variable voltage boost converter 235. Variable voltage boost converters are well known in the art.

Figure 8E:
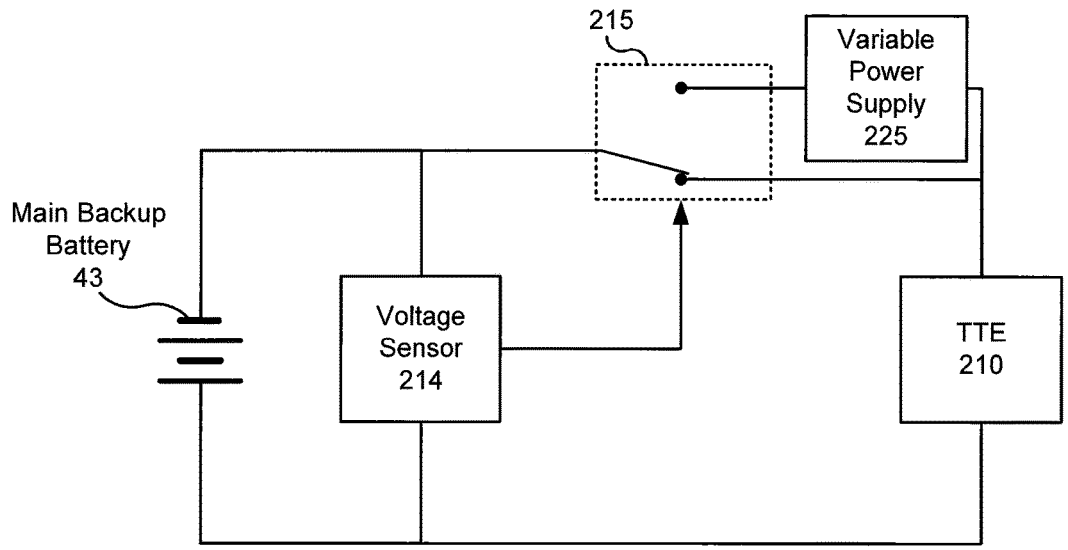
Figure 13:
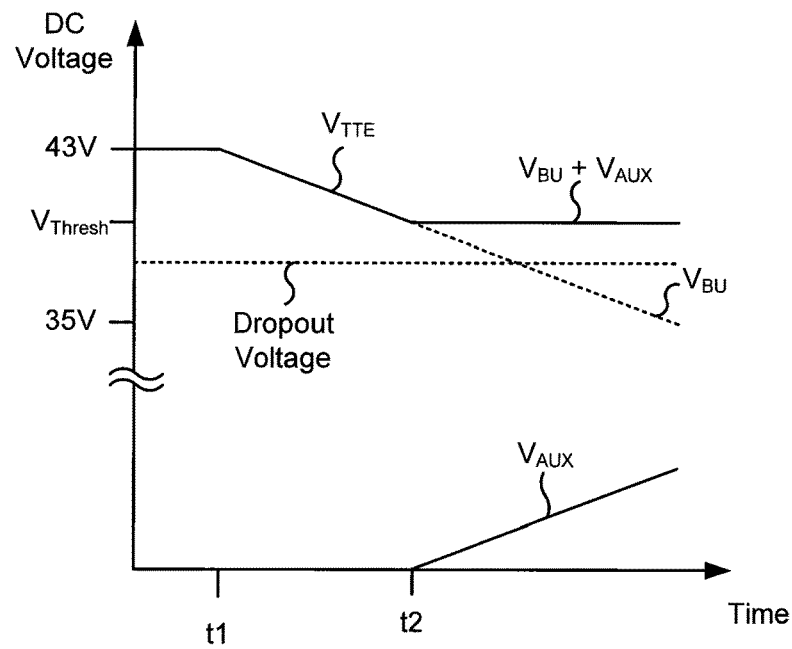
FIGS. 13 and 14 are simplified, schematic graphs of auxiliary backup voltages supplied to tower top equipment mounted on an antenna tower according to various embodiments.
Figure 14:
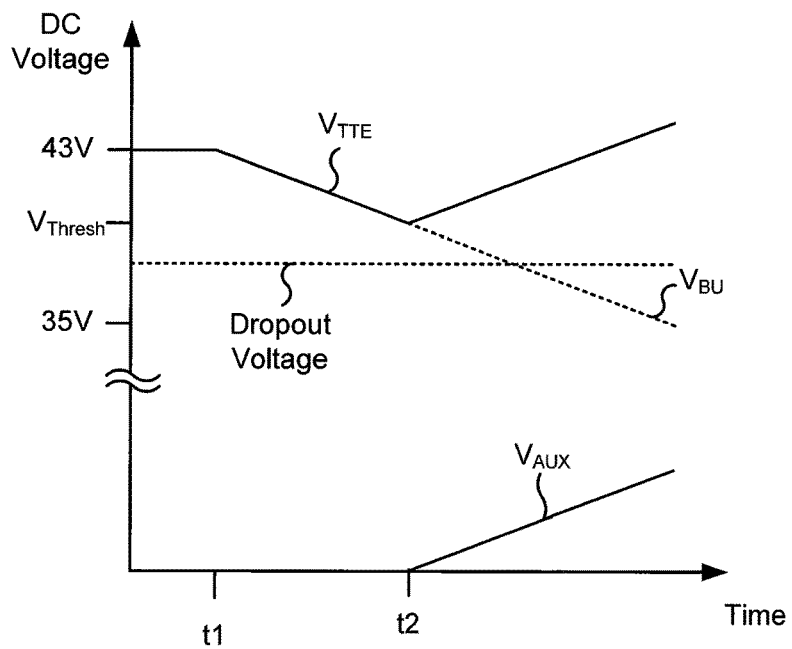

FIG. 8E illustrates an auxiliary power supply 220 similar to the auxiliary power supply circuit of FIG. 8B, except that a variable voltage source is switched into series with the main backup battery 43 when the voltage supplied by the main backup battery 43 drops to or below a predetermined threshold. The voltage $V_{AUX}$ output by the variable voltage source 225 may be controlled so that the total voltage $V_{TTE}$ supplied to the TTE 210 is maintained at a level $V_{Thresh}$ that is just above the dropout voltage of the TTE 210, as illustrated in FIG. 13.

Figure 8F:
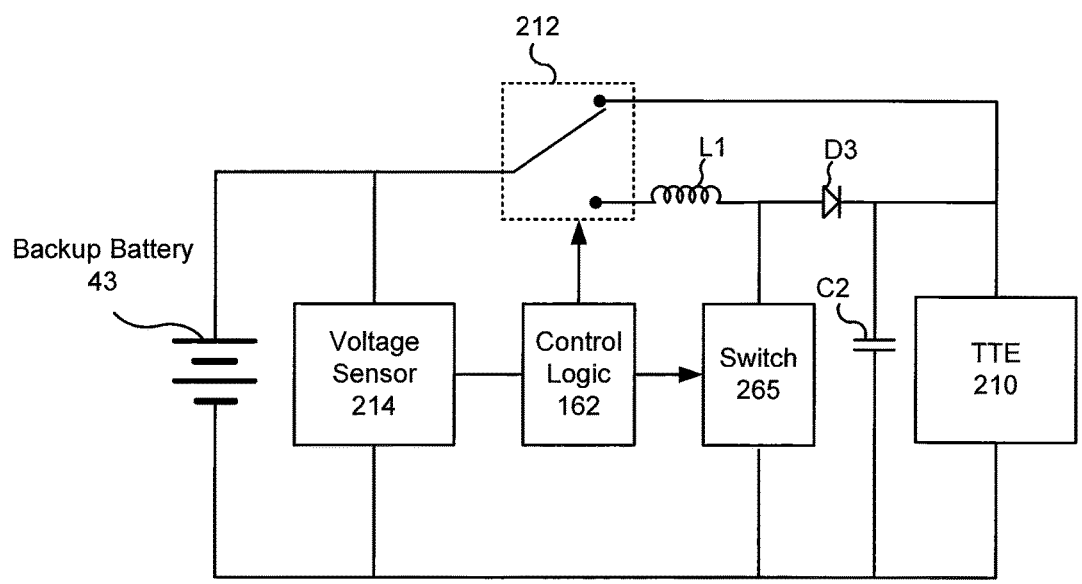

FIG. 8F illustrates an auxiliary power supply 220 including a boost converter. A control logic circuit 162 monitors the voltage supplied by the main backup battery 43 and, when the voltage drops below a threshold, couples a boost converter circuit including a switch 265, a boost inductor L1, a diode D3 and an output capacitor C2 to the TTE 210. The switch 265 selectively couples the boost inductor to ground, causing current in the boost inductor L1 to increase rapidly. When the switch 265 is opened, energy stored in the boost inductor L1 is transferred through the diode D3 and into the output capacitor C1, which supplies an output voltage to the TTE 210 that is above the dropout voltage of the TTE 210.

Figure 9:
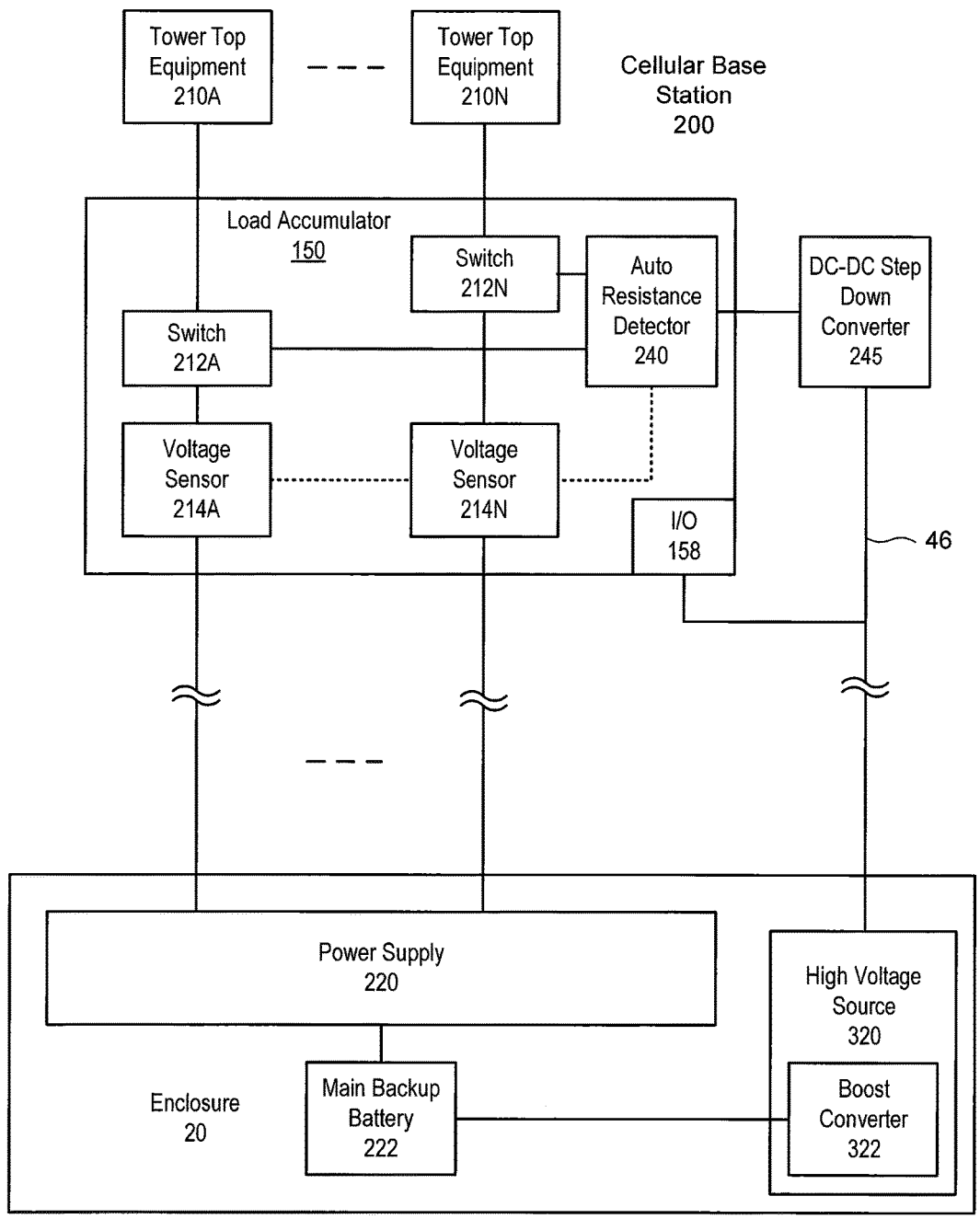
FIGS. 9 and 10 are simplified, schematic views of cellular base stations including load accumulators according to various embodiments.

FIG. 9 illustrates an embodiment in which a supplemental voltage having a dramatically increased DC voltage level is supplied by a ground-based high voltage DC (HVDC) source 320 including a boost converter 322. The voltage supplied by the HVDC source 320 may be well beyond the maximum specified voltage for the DC power signal that can be handled by the TTE 210. The HVDC signal is converted to a usable voltage level by a tower-mounted DC-to-DC step-down converter 245, which steps down the voltage of the HVDC power signal. The step-down converter 245 may be a buck converter. As the increased voltage reduces the current necessary to supply the wattage required by the remote radio head, the power loss along the power cable may be reduced.

In particular, some embodiments may employ a "Buck-Boost" scheme in which a DC-to-DC converter at the bottom of the tower is a boost converter that increases the voltage of the DC power signal from the main backup battery 222 to a voltage level that is above the necessary level to operate the TTE, while a DC-to-DC converter 245 at the top of the tower is a buck converter that reduces the voltage of the DC power signal to a desired level.

The DC-to-DC step down voltage converter 245 is mounted on the tower proximate the load accumulator 150. The HVDC signal is supplied over a power cable 46 that runs from the enclosure 20 at the base of the tower up to the DC-to-DC converter 245. This high voltage DC power signal may experience significantly less power loss when traversing the power cable 46.

Moreover, because the current carried by the power cable 46 is low, the power cable 46 can be implemented with a small diameter two-conductor cable, such as a coaxial cable. A modulated data signal can also be carried by the power cable 46 to allow for data transmission to/from the load accumulator via the data I/O port 158, which may include a modem for demodulating data transmitted over the power cable 46.

FIG. 9 further illustrates that the load accumulator 150 may include a resistance detector 240 that can measure a resistance of the power cable 46. The cable resistance detector 240 may be implemented in a variety of ways. For example, in some embodiments, the cable resistance detector 240 may transmit a voltage pulse onto the power cable 46 and measure the reflected return pulse (the far end of the power cable may be terminated with a termination having known characteristics). The current of the voltage pulse may be measured, as well as the voltage level of the reflected return pulse. The control logic of the load accumulator 150 may then apply Ohm's law to calculate the resistance of the power cable 46. In other embodiments, at the far end of the power cable 46 the two conductors thereof may be shorted and a voltage pulse may again be transmitted through the power cable 46. The current level of the pulse and the voltage level of the return pulse may be measured and the control logic may again use these measured values to calculate the resistance of the power cable 46. In other embodiments, the DC resistance can be measured by transmitting alternating current signals at different frequencies over the power cable 46 and measuring the amplitude and phase shift of these signals at the far end of the power cable 46. The DC resistance may then be calculated using the measured results. Other ways of measuring the resistance of a wire segment are known to those of skill in the art and may be used instead of the example methods listed above. Additional techniques for determining the resistance are also discussed below.

It will also be appreciated that in other embodiments the resistance detector 240 may measure an impedance of the power cable 46 and use this measured impedance value to determine the resistance of the power cable 46.

One disadvantage of the approaches of FIG. 9 is that it requires the installation of additional equipment (i.e., the DC-to-DC converter 42) at the top of the tower 30. As the cost associated with installing equipment on a tower may be very high, there is generally a preference to reduce or minimize, where possible, the amount of equipment that is installed at the top of a cellular base station tower, and the equipment that is installed at the top of cellular towers tends to be expensive as it typically is designed to have very low failure rates and maintenance requirements in order to reduce the need for technician trips up the tower to service the equipment. The inclusion of an additional DC-to-DC converter 245 also represents a further increase in capital expenditures, which may at least partially offset the anticipated savings in operating costs.

Figure 10:
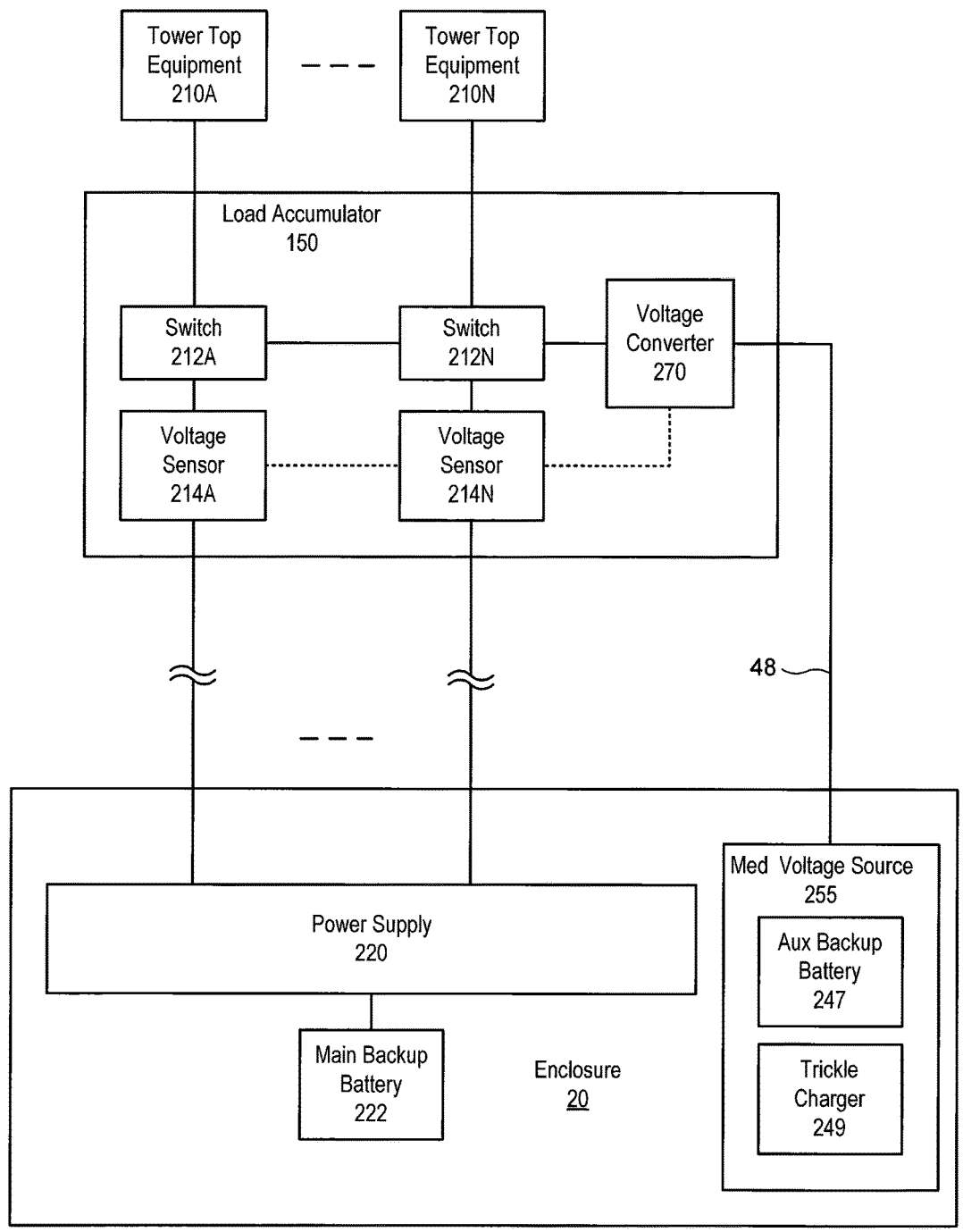

Referring to FIG. 10, a DC power signal may be supplied to a tower-mounted load accumulator 150 over a power cable 48, where the DC power signal that is supplied to the TTE 210 may have, for example, a relatively constant voltage level or a voltage level within a pre-selected range, regardless of the current drawn by the TTE 210. The voltage level of the DC power signal supplied to the load accumulator 150 may be set to be at or near a maximum power signal voltage that a TTE 210 connected to the load accumulator 150 can handle, thereby reducing the power loss of the DC power signal. In this manner, the operating costs for the cellular base station may be reduced. The DC power signal may be generated by a medium voltage source 255 mounted in the enclosure 20 and including an auxiliary backup battery 247 and a trickle charger 249. The medium voltage source 255 may supply a medium voltage, such as from 50 to 75 volts, to a voltage converter 270 in the load accumulator 150. The voltage converter 270 may convert the medium voltage to a voltage that can be used to power the TTE 210.

In some embodiments, the voltage converter 270 can detect a voltage supplied by the power supply 220 using the voltage sensors 214 and supply a voltage to the switches 212 that starts out at a level similar to threshold voltage level at which the load accumulator 150 begins to supply backup power to the TTE 210, and gradually raise the voltage supplied to the TTE 210 to a higher level (e.g., from 38V to 48V). This is illustrated, for example, in FIG. 14. As shown therein, when the backup voltage $V_{BU}$ supplied by the power supply 220 drops to $V_{Thresh}$, the load accumulator 150 switches to cause the auxiliary power signal $V_{AUX}$ output by the voltage converter 270 to be supplied to the TTE 210 instead of the backup voltage $V_{BU}$. Moreover, the voltage converter 270 output voltage starts at $V_{Thresh}$ and increases from $V_{Thresh}$ a higher voltage, e.g., 48V.

The embodiments illustrated in FIGS. 9 and 10 may be utilized as a redundant backup power system for power supplies used in cellular base stations, such as those disclosed in U.S. Publication No. 2015/0234399, which is assigned to the assignee of the present application, and which is incorporated herein by reference in its entirety. For example, U.S. Publication No. 2015/0234399 discloses cellular base station systems including a first power supply that generates a first DC power signal and a second power supply including a DC-to-DC converter that accepts the DC power signal output by the first power supply as an input and outputs a second DC power signal having a different voltage. The second DC power signal can be supplied to a TTE with reduced loss. However, if the second power supply fails, the embodiments illustrated in FIGS. 9 and 10 can supply redundant DC power to the TTE.

Figure 15:
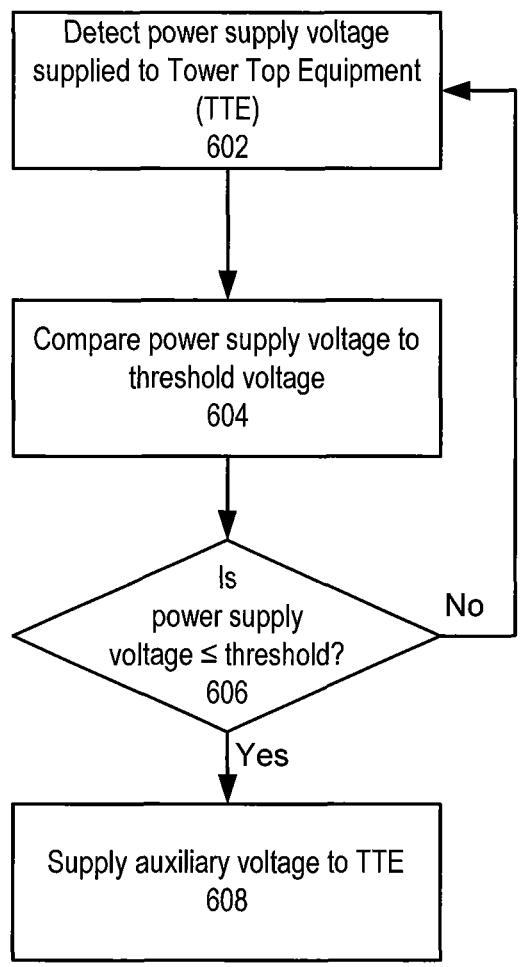
FIG. 15 is a flowchart illustrating operations of a load accumulator according to some embodiments.

FIG. 15 is a flowchart of operations of a load accumulator 150 according to some embodiments. As illustrated therein, the load accumulator 150 may detect a power supply voltage supplied to a tower top equipment (TTE) 210 that is mounted on an antenna tower (block 602). In particular, the load accumulator 150 may detect power supply voltages supplied to a number of TTE 210 that are mounted on the antenna tower. The load accumulator 150 compares the power supply voltage to a threshold voltage associated with the TTE (block 604). A different threshold voltage may be established for different TTE on the antenna tower. If it is determined at block 606 that the threshold power supply voltage has dropped to or below the threshold voltage, the load accumulator 150 may supply an auxiliary voltage to the TTE (block 608).

The auxiliary voltage may be supplied to the TTE in addition to or instead of the power supply voltage. Thus, in particular embodiments, the auxiliary voltage may be added to the power supply voltage to form a combined voltage, and the load accumulator 150 may supply the combined voltage to the TTE.

The level of the auxiliary voltage may be increased as the power supply voltage decreases so that the combined voltage remains relatively constant, as illustrated, for example, in FIG. 13.

In some embodiments, the auxiliary voltage may be supplied from an auxiliary backup battery mounted on the tower, as illustrated, for example, in FIG. 6. In other embodiments, the auxiliary voltage may be supplied by generating a high voltage at a ground mounted backup power source such as the high voltage source 320 shown in FIG. 9, supplying the high voltage to a tower mounted voltage converter, such as the DC-DC step down converter 245 in FIG. 9, and converting the high voltage to the auxiliary voltage at the tower mounted voltage converter.

While embodiments are primarily described above with respect to cellular base stations that have conventional antenna towers, it will be appreciated that the techniques and systems described herein may be applied to a wide variety of other cellular systems. For example, cellular service is often provided in tunnels by locating the baseband equipment and power supply in an enclosure and then connecting this equipment to remote radio heads and antennas via long horizontal trunk cables. Very long cabling connections may be used in some instances, and the voltage drop along the cable may be particularly problematic in such installations. Similarly, in some metrocell architectures, the same concept is applied above-ground, with the remote radio heads and antennas typically mounted on smaller, pre-existing structures such as utility poles, buildings and the like. Once again, the trunk cables connecting the baseband equipment and power supplies to the distributed remote radio heads and antennas may be very long (e.g., a kilometer or more in some cases), and hence voltage drop likewise may be a significant problem. Any of the above-described embodiments may be used in these or similar applications.

The present invention has been described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. Like numbers refer to like elements throughout the specification and drawings. It will also be appreciated that the embodiments disclosed above can be combined in any way and/or combination to provide many additional embodiments.

It will be understood that, although the terms first, second, etc. are used herein to describe various elements, these elements should not be limited by these terms. These terms are only used to distinguish one element from another. For example, a first element could be termed a second element, and, similarly, a second element could be termed a first element, without departing from the scope. As used herein, the term "and/or" includes any and all combinations of one or more of the associated listed items.

Unless otherwise defined, all technical and scientific terms that are used in this disclosure have the same meaning as commonly understood by one of ordinary skill in the art to which this invention belongs. The terminology used in the above description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

In the description above, when multiple units of an element are included in an embodiment, each individual unit may be referred to individually by the reference numeral for the element followed by an alphanumeric character for the individual unit (e.g., a TTE 210A), while multiple units of the element may be referred to collectively by their base reference numeral (e.g., the TTE 210).

It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

In the drawings and specification, there have been disclosed typical embodiments of the inventive concept and, although specific terms are used, they are used in a generic and descriptive sense only and not for purposes of limitation, the scope of the inventive concept being set forth in the following claims.

That which is claimed is:

1. A load accumulator for a cellular base station antenna, the load accumulator comprising:
    a plurality of input terminals configured to receive a plurality of input voltages;
    a plurality of output terminals configured to be coupled to a respective plurality of tower top equipment and configured to supply output voltages to the tower top equipment;
    a plurality of switches coupled to respective ones of the plurality of input terminals and the plurality of output terminals;
    a voltage sensor coupled to at least one input terminal of the plurality of input terminals and configured to sense a level of one of the plurality of input voltages received at the at least one input terminal;
    a supplemental input terminal configured to receive a supplemental voltage; and
    a control logic coupled to the voltage sensor and to the plurality of switches and configured to detect that the supply voltage supplied to the at least one input terminal has fallen below a threshold voltage, and in response to detecting that the supply voltage supplied to the at least one of the plurality of input terminals has fallen below the threshold voltage, to supply the supplemental voltage to a respective one of the plurality of output terminals.

2. The load accumulator of claim 1, wherein the control logic is configured to add the supplemental voltage to the input voltage supplied to the at least one of the plurality of input terminals to form a combined output voltage and to supply the combined output voltage to the respective one of the plurality of output terminals.

3. The load accumulator of claim 2, wherein the control logic is configured to increase a level of the supplemental voltage over time so that the combined voltage remains stable as the input voltage supplied to the at least one of the plurality of input terminals drops over time.

4. The load accumulator of claim 1, wherein the control logic is configured to supply the supplemental voltage alone to the respective one of the plurality of output terminals.

5. The load accumulator of claim 1, further comprising a plurality of voltage sensors coupled to respective ones of the plurality of input terminals.

6. The load accumulator of claim 1, further comprising a DC-DC voltage converter configured to receive a high voltage input voltage and output a low voltage output voltage as the supplemental voltage.

7. The load accumulator of claim 1, wherein the plurality of tower top equipment comprises a remote radio head and/or a terrestrial microwave transceiver.

8. The load accumulator of claim 1, further comprising an auxiliary power supply coupled to the supplemental input terminal and configured to supply the supplemental input voltage.

9. The load accumulator of claim 8, wherein the auxiliary power supply comprises a battery and a trickle charger coupled to the battery.

10. The load accumulator, of claim 1, further comprising a resistance detector coupled to the plurality of input terminals and configured to measure a resistance of input lines coupled to the plurality of input terminals.

11. The load accumulator of claim 1, wherein the switch comprises a diode switch including a first diode having an cathode connected to the at least one input terminal and a second diode having a cathode connected to the supplemental input terminal, wherein the first and second diodes each include an anode coupled together and to the respective one of the plurality of output terminals.

12. The load accumulator of claim 1, further comprising a variable voltage boost power supply coupled to the supplemental input terminal.

13. A backup power system for a cellular base station antenna, comprising:
    an auxiliary voltage source; and
    a load accumulator comprising:
    an input terminal configured to receive an input voltage;
    an output terminal configured to be coupled to a tower top equipment and configured to supply an output voltage to the tower top equipment;
    a switch coupled to the input terminal and the output terminal;
    a voltage sensor coupled to at least one input terminal of the plurality of input terminals and configured to sense a level of the input voltage received at the input terminal;
    a supplemental input terminal coupled to the auxiliary voltage source and configured to receive a supplemental voltage from the auxiliary voltage source; and
    a control logic coupled, to the voltage sensor and to the switch and configured to detect that the supply voltage supplied to the input terminal has fallen below a threshold voltage, and in response to detecting that the supply voltage supplied to the input terminal has fallen below the threshold voltage, to supply the supplemental voltage to the output terminal.

14. The backup power system of claim 13, wherein the auxiliary voltage source comprises a backup battery and a trickle charger coupled to the backup battery.

15. The backup power system of claim 13, wherein the auxiliary voltage source comprises a high voltage source configured to generate a high voltage DC signal, the backup power system further comprising a step down voltage converter configured to receive the high voltage DC signal from the high voltage source, to generate the supplemental voltage having a lower voltage than the high voltage DC signal in response to the high voltage DC signal, and to supply the supplemental voltage to the supplemental input terminal.

16. A method, of supplying power to a tower top equipment (TTE) mounted on an antenna tower, the method comprising:

detecting a power supply voltage that is supplied to the TTE by a power supply line that extends from a ground mounted power supply to the TTE on the antenna tower;

generating a comparison result, wherein generating the comparison result comprises comparing the power supply voltage to a threshold voltage associated with the TTE; and supplying an auxiliary voltage to the TTE based on the comparison result.

17. The method of claim 16, farther comprising:

adding the auxiliary voltage to the power supply voltage to form a combined voltage; and supplying the combined voltage to the TTE.

18. The method of claim 17, further comprising increasing a level of the auxiliary voltage as the power supply voltage decreases so that the combined voltage remains relatively constant.

19. The method of claim 16, wherein supplying the auxiliary voltage comprises supplying the auxiliary voltage from an auxiliary backup battery mounted on the tower.

20. The method of 16, wherein supplying the auxiliary voltage comprises generating a high voltage at a ground mounted backup power source; supplying the high voltage to a tower mounted voltage converter; and converting the high voltage to the auxiliary voltage at the tower mounted voltage converter.

* * * * *

UNITED STATES PATENT AND TRADEMARK OFFICE
CERTIFICATE OF CORRECTION

PATENT NO.          : 10,128,685 B2
APPLICATION NO.     : 15/591421
DATED               : November 13, 2018
INVENTOR(S)         : John T. Hanley Page 1 of 1

It is certified that error appears in the above-identified patent and that said Letters Patent is hereby corrected as shown below:

In the Claims

Column 16, Line 61, Claim 13: Please correct "coupled, to the voltage sensor" to read -- coupled to the voltage sensor --

Signed and Sealed this
Twenty-sixth Day of November, 2019

Andrei Iancu
*Director of the United States Patent and Trademark Office*